United States Patent
Falc et al.

(10) Patent No.: US 11,077,372 B2
(45) Date of Patent: Aug. 3, 2021

(54) METHOD FOR CONTROLLING A DISPLAY ELEMENT BY A GAMES CONSOLE

(71) Applicant: NACON SA, Fretin (FR)

(72) Inventors: Alain Falc, Kortrijk (BE); Yannick Allaert, Meurchin (FR); Alexandre Notebaert, Tourcoing (FR); Stephen Dudoyer, Lesquin (FR)

(73) Assignee: NACON SA, Fretin (FR)

( * ) Notice: Subject to any disclaimer, the term of this patent is extended or adjusted under 35 U.S.C. 154(b) by 0 days.

(21) Appl. No.: 16/639,684

(22) PCT Filed: Aug. 10, 2018

(86) PCT No.: PCT/EP2018/071781
§ 371 (c)(1),
(2) Date: Feb. 17, 2020

(87) PCT Pub. No.: WO2019/034560
PCT Pub. Date: Feb. 21, 2019

(65) Prior Publication Data
US 2020/0261800 A1      Aug. 20, 2020

(30) Foreign Application Priority Data

Aug. 17, 2017  (EP) .................................... 17306074

(51) Int. Cl.
*A63F 13/53* (2014.01)
*A63F 13/25* (2014.01)

(52) U.S. Cl.
CPC .............. *A63F 13/53* (2014.09); *A63F 13/25* (2014.09)

(58) Field of Classification Search
CPC .......... A63F 13/53; A63F 13/25; A63F 13/50; A63F 13/52; A63F 13/525;
(Continued)

(56) References Cited

U.S. PATENT DOCUMENTS 6,396,473 B1 * 5/2002 Callahan ................ G09G 5/397
  345/530
8,913,039 B2 * 12/2014 Nikolovski ........... G06F 3/0416
  345/177

(Continued)

FOREIGN PATENT DOCUMENTS

EP      2450776       5/2012
EP      2524721      11/2012
(Continued)

OTHER PUBLICATIONS

International Search Report (and English translation) and Written Opinion for International Application No. PCT/EP2018/071781 dated Oct. 25, 2018.

*Primary Examiner* — Allen Chan
(74) *Attorney, Agent, or Firm* — Patterson Thuente Pedersen, P.A.

(57) ABSTRACT

A control process of a display element, the process comprising the steps:
  measuring a position of a control lever,
  projecting in a base plane the position of the lever to determine a first set of coordinates,
  determining a homothetic figure on a mechanical stop of the lever,
  determining a circumscribed square on the homothetic figure,
  projecting onto the circumscribed square at least one coordinate of the first set of coordinates,
  calculating a second set of coordinates in a Cartesian reference frame, on the basis of the projection of said at least one coordinate of the first set of coordinates on the circumscribed square.

15 Claims, 2 Drawing Sheets

(58) Field of Classification Search
CPC .............. A63F 13/5258; A63F 2300/66; A63F 2300/6661; A63F 2300/6684
USPC ........................................................ 463/31
See application file for complete search history.

(56) References Cited

U.S. PATENT DOCUMENTS

| | | | |
|---|---|---|---|
| 9,033,805 B2* | 5/2015 | Somarajapuram | A63F 13/63 463/42 |
| 2010/0009735 A1* | 1/2010 | Seydoux | A63F 13/803 463/6 |
| 2010/0062817 A1* | 3/2010 | Seydoux | A63F 13/216 463/6 |
| 2013/0100021 A1 | 4/2013 | Larsen et al. | |
| 2014/0228115 A1* | 8/2014 | Kaplan | A63F 13/52 463/31 |
| 2014/0295942 A1 | 10/2014 | Ichiki | |

FOREIGN PATENT DOCUMENTS

| | | |
|---|---|---|
| FR | 3031404 | 7/2016 |
| JP | 2013176457 | 9/2013 |
| WO | WO2014106594 | 7/2014 |

* cited by examiner

METHOD FOR CONTROLLING A DISPLAY ELEMENT BY A GAMES CONSOLE

RELATED APPLICATIONS

This present application is a National Phase entry of PCT Application No. PCT/EP2018/071781 filed Aug. 10, 2018 which claims priority to European Application No. 17306074.0 filed Aug. 17, 2017 the contents of each being incorporated herein by reference in their entireties.

TECHNICAL FIELD

The present invention relates in general to a control process of a display element generated on a display screen by a video games console coupled to a games controller. In particular, embodiments of the invention relate to control of the display element when the games controller comprises a lever or a joystick moved by a user to control the position and/or travel of the display element which can be a sighting cursor or a scene viewed by an avatar of the user, from a position in the game or a control station, for example.

BACKGROUND

It is known in the prior art to use as much a system of coordinates according to a Cartesian frame of reference as polar to manage measuring the position of the lever, as disclosed by document EP2450776A1. Yet, it is often still necessary to send the games console coordinates according to a system of Cartesian coordinates, due to the standardized format for the games console.

It is common practice to project the measured positions in a base plane (which can for example be perpendicular to the lever when the latter is in the rest position, vertical for example). In the event where the lever can evolve in a travel zone limited by a mechanical stop (such as a hexagon or other polygon, any shape or even an ellipse), it is common to send to the console a full-scale signal when the lever is stopped and according to one of the diagonals of the base plane, and not to increase this signal when the lever moves into zones located beyond the edges of a square inscribed in a projection of the mechanical stop, and having its apices on the above diagonals.

The predetermined travel zone of the lever is defined as being a zone of the space in which the lever can move before stopping with the casing of the games controller, for example. As is known, this stop can be a polygon, such as an octagon or a hexagon or even an ellipse, for example.

As a consequence, this management mode results in limitation of the travel zone (which has a form projected in the form of a polygon, any shape or even an ellipse) to an effective measuring zone (which is the square inscribed in the projection of the mechanical stop).

SUMMARY

An aim of embodiments of the present invention is to respond to the disadvantages of the document of the prior art mentioned hereinabove and in particular to first propose a control process of a position and/or travel of a display element generated on a display screen by a video games console coupled to a games controller comprising a control lever arranged to be shifted by a user according to at least two degrees of freedom in a determined zone, which exploits the entire travel zone of the control lever, while sending Cartesian coordinates to the games console.

For this, a first aspect of embodiments of the invention relate to a control process of a position and/or travel of a display element generated on a display screen by a video games console coupled to a games controller comprising a control lever arranged to be shifted by a user according to at least two degrees of freedom in a zone delimited by a mechanical stop, the process comprising the steps comprising of:
measuring a position of the control lever in the determined zone with at least one sensor outputting at least one electric signal per degree of freedom,
projecting in a base plane the position of the control lever measured with the at least one sensor, to determine a first set of coordinates,
determining a homothetic figure of a projection of the mechanical stop in the base plane, centered on a rest position of the control lever and passing through the projected position of the control lever in the base plane,
determining a circumscribed square on the homothetic figure,
projecting onto the circumscribed square at least one coordinate of the first set of coordinates,
calculating a second set of coordinates in a Cartesian frame of reference, on the basis of the projection of the at least one coordinate of the first set of coordinates on the circumscribed square so as to be able to send to the console the second set of Cartesian coordinates which is an image of the first set of coordinates.

The process according to the execution hereinabove comprises a step which defines a circumscribed square on the homothetic figure (that is, a square which encloses the homothetic figure, and whereof at least two sides are each tangential to the homothetic figure), offering the possibility of executing projection onto one of the sides of the circumscribed square of the projected position in the base plane. This second projection moves from a projected position which is on the homothetic figure to a second projected position (defined by the projection of at least one of the coordinates of the projected position) which for its part is on the circumscribed square. This easily defines Cartesian coordinates, and when the control lever is at a mechanical stop on a mechanical stop of hexagonal or polygonal shape, any shape or even an ellipsoidal shape, coordinates are naturally obtained which are on the circumscribed square to the projection of the mechanical stop (as the control lever is at a mechanical stop).

As a consequence, the projection on the circumscribed square defines a second position point (having as coordinates the second set of coordinates) which constructs a second vector between the origin (the rest position) and the second point whereof the norm is greater than or equal to the norm of a first vector constructed between the origin and the projected position in the base plane.

It should be noted that when the control lever is shifted according to an axis which passes through a point of tangency between the circumscribed square to the projection and the homothetic figure (that is, the projected point belongs simultaneously to both figures), there is no modification of coordinates. As a consequence, when the control lever is shifted anywhere else than according to an axis, the projection on the circumscribed square amounts to increasing or extending one of the measured coordinates to define the second set of Cartesian coordinates.

Also, the lever can be mounted as a ball-and-socket linkage relative to the games controller, that is, it is mobile according to two rotations but not in translation or according to a third rotation (generally around the lever). However, the process applies also to a lever which is mobile according to two translations in a plane, and which is blocked according to the three rotations and a translation. As indicated, it is enough for the lever to be mobile according to two degrees of freedom for the method forming the subject matter of the invention to be applied.

Also, the projection in the base plane is advantageously an orthogonal projection relative to the base plane, but an oblique projection is possible, that is, the direction of projection is not perpendicular to the base plane, but inclined (at least by a few degrees for example) relative to the base plane. In other terms, the base plane can be perpendicular to the lever when the latter is in the rest position, but this is not necessary for carrying out the method forming the subject matter of the invention. However, good resolution needs to be conserved, so that the direction of projection will not be inclined by more than 20° for example relative to the base plane. This amounts to carrying out projection in a base plane which is not perpendicular to the control lever in its rest position.

In particular, the homothetic figure to be determined which passes through the projected position is not a circle. In other words, the mechanical stop of the lever is not made against a casing portion having a circular form. Embodiments of the invention therefore relate to managing the coordinates of a lever which evolves in a zone delimited by a stop of non-circular form.

Advantageously, the mechanical stop has a polygonal shape, and the step for determining the homothetic figure comprises a step consisting of determining in the base plane an angular sector containing the projected position of the control lever, then a step consisting of determining a straight line passing through the projected position and parallel to one side of the polygonal projection of the mechanical stop in the base plane, contained in the determined angular sector. According to this embodiment, if the mechanical stop has a polygonal shape, then determining the homothetic figure is done in two stages, with a step for identifying the angular sector containing the projected position, to then be able to determine which is the nearer side of the polygon.

Advantageously, the mechanical stop has an elliptical shape, and the step for determining the homothetic figure comprises a step consisting of determining a position ellipse centered on the rest position of the control lever and passing through the projected position of the control lever in the base plane.

Advantageously, the projection step of said at least one coordinate of the first set of coordinates on the circumscribed square comprises a step of determining a projected position point as being a point of intersection of an axis passing through the rest position of the control lever and through the projected position, with the circumscribed square. In other terms, the projected position is projected again according to the direction of an axis which defines one of the coordinates of a system of polar or cylindrical coordinates (the distance from the origin).

According to the preferred method, the projection step of said at least one coordinate of the first set of coordinates on the circumscribed square comprises a step consisting of projecting onto the circumscribed square the projected position, according to a direction of projection defined by a radius of the homothetic figure, passing through the projected position.

Advantageously, the calculation step of the second set of Cartesian coordinates comprises:

a step of calculating a first length as being a length of a segment connecting the rest position to the projected position, a step of calculating a second length as being a length of a segment connecting the rest position to the projected position point (located on the circumscribed square), a step of multiplying each coordinate of the first set of coordinates by a factor defined by a ratio of the second length on the first length. The first set of coordinates is according to the Cartesian system, and the final step of this execution amounts to carrying out homothety on each coordinate of the first set of coordinates. The homothety ratio is greater than or equal to 1, and is equal to the ratio of the distance from the origin of the projected position point (belonging to the circumscribed square) on the distance from the origin of the projected position (belonging to the homothetic figure). The homothety ratio is equal to 1 only when the control lever is shifted according to a direction which passes through a tangency point between the circumscribed square and the homothetic figure. In all other cases, it is greater than 1.

According to a first alternative, the projection step of the at least one coordinate of the first set of coordinates on the circumscribed square comprises at least one step of projecting on the circumscribed square the projected position, according to a direction of projection defined by an axis of an orthonomed system.

According to a particular case of the first alternative, the projection step of the at least one coordinate of the first set of coordinates on the circumscribed square comprises:

a single step of projecting onto the circumscribed square the projected position, according to a first direction of projection defined by an axis of an orthonomed system defining the shortest distance between the projected position and the circumscribed square, to define a single projection point. This method avoids calculating conversion coefficients, quickly sending the second set of coordinates.

Advantageously, the second set of Cartesian coordinates is defined by the Cartesian coordinates of the single projection point.

Advantageously, the steps of determining the homothetic figure, determining the circumscribed square on the homothetic figure, projecting onto the circumscribed square the at least one coordinate, and calculating the second set of coordinates in a Cartesian frame of reference (according to the preferred execution or the first alternative) are conducted previously for all the possible projected positions of the control lever in the base plane so as to define a predefined conversion table of the first set of coordinates towards the second set of coordinates. Otherwise expressed, the steps linked to the projection are conducted prior to use of the games controller to create a predefined conversion table which is stored in computer storage means of the games controller. As a consequence, calculations are limited during use of the games controller.

Advantageously, the predefined conversion table inputs the first set of coordinates, and outputs a coefficient for multiplying with each coordinate of the first set of coordinates, to calculate the second set of coordinates. The calculations are limited to multiplying the first set of coordinates with the coefficient.

Advantageously, the predefined conversion table inputs the first set of coordinates, and outputs the second set of coordinates In other words, the steps of determining the homothetic figure, determining the circumscribed square to the homothetic figure, projecting onto the circumscribed square the at least one coordinate, and calculating the second set of coordinates in a Cartesian frame of reference are conducted using a predefined conversion table, the predefined conversion table inputting the first set of coordinates, and outputting a coefficient for multiplying with each coordinate of the first set of coordinates to calculate the second set of coordinates.

Advantageously, the control process comprises a step of sending the second set of Cartesian coordinates to the games console.

Advantageously, the position and/or the travel of the display element generated on the display screen is modified on the basis of the second set of Cartesian coordinates.

Advantageously, the steps as far as the calculation step of the second set of coordinates are conducted with a first resolution, and a step consisting of reducing the resolution prior to the step for sending the second set of coordinates is provided, for sending the second set of coordinates according to a second resolution, lower than the first resolution. This execution retains good precision during calculations, and sends the second set of coordinates according to a format which does not need much calculation time for the games console or transmission time between the controller and the console.

Other characteristics and advantages of embodiments of the present invention will emerge more clearly from the following detailed description of three embodiments of the invention given by way of non-limiting examples and illustrated by the appended drawings.

DETAILED DESCRIPTION

Figure 1:
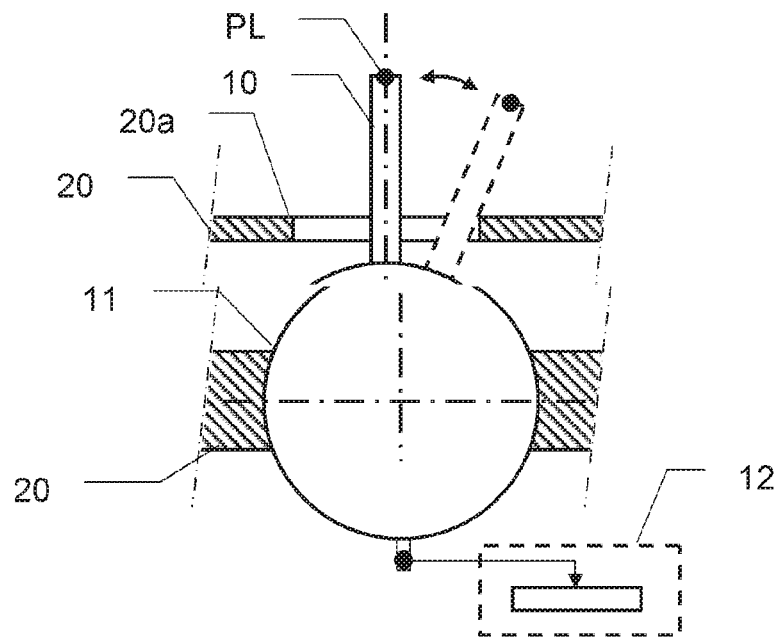
FIG. 1 illustrates a sectional view of a control lever of a games controller video for controlling a position and/or travel of a display element generated on a display screen by a video games console coupled to the games controller, by the process according to the an embodiment of invention.

FIG. 1 illustrates a control lever 10 of a games controller. Such a control lever 10 can be also called "joystick" or "stick". Typically, such a control lever 10 is arranged on an upper surface of a games controller so that it can be actuated and shifted by a user of a video games console, for example to cause movement of a figure, travel of a targeting sight, or even movement of a virtual camera of a video game.

In general, the control lever 10 is therefore mobile relative to a casing 20 of the games controller video, and can be articulated relative to the casing 20 according to a ball—and—socket linkage as shown in FIG. 1. Other links between the control lever 10 and the casing 20 are possible, as for example a linkage allowing just a single flat movement of the control lever 10.

However, the control lever 10 can be shifted in a predefined travel zone only, and limited by a stop 20a. In the case shown, the stop 20a is a ridge of the casing 20, forming a hole through which the control lever 10 passes via the casing 20. To detect the movements of the control lever 10, the latter is connected to at least one position sensor 12, such as a potentiometer. Such a position sensor 12 detects the movements of the control lever 10, and therefore calculates a position of a point PL of the control lever 10, for example.

In the present case, the control lever 10 can be shifted here according to two degrees of freedom, so that two position sensors can of course be provided, or a single position sensor with two measuring tracks to measure precisely all the positions which the control lever 10 can occupy.

Figure 2:
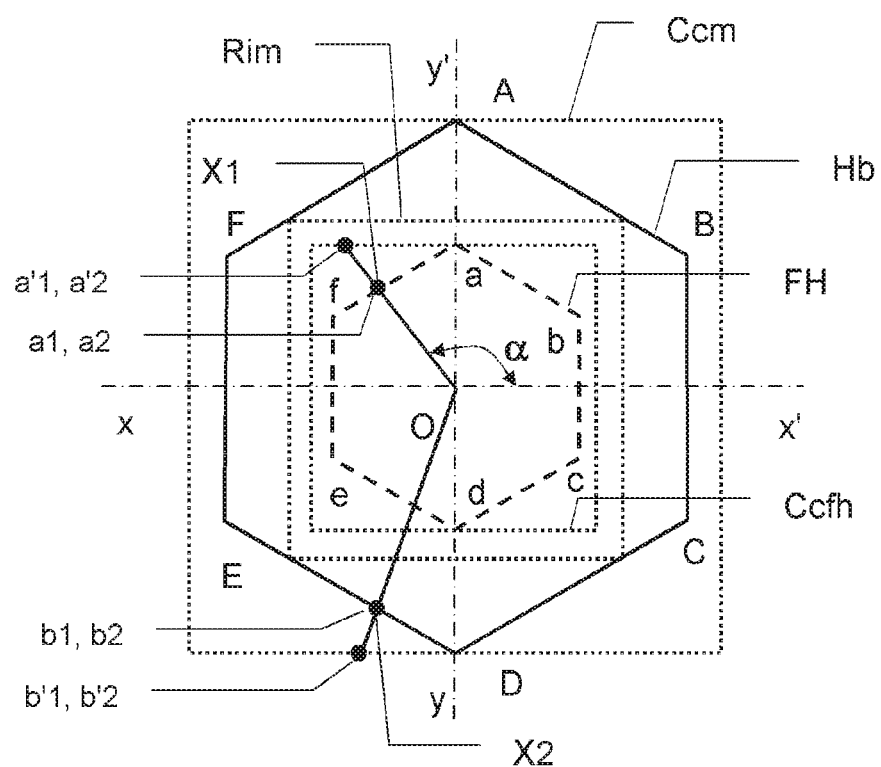
FIG. 2 illustrates a first execution of the processing of the measured position of the control lever of FIG. 1 performed by the process according to the invention.
Figure 3:
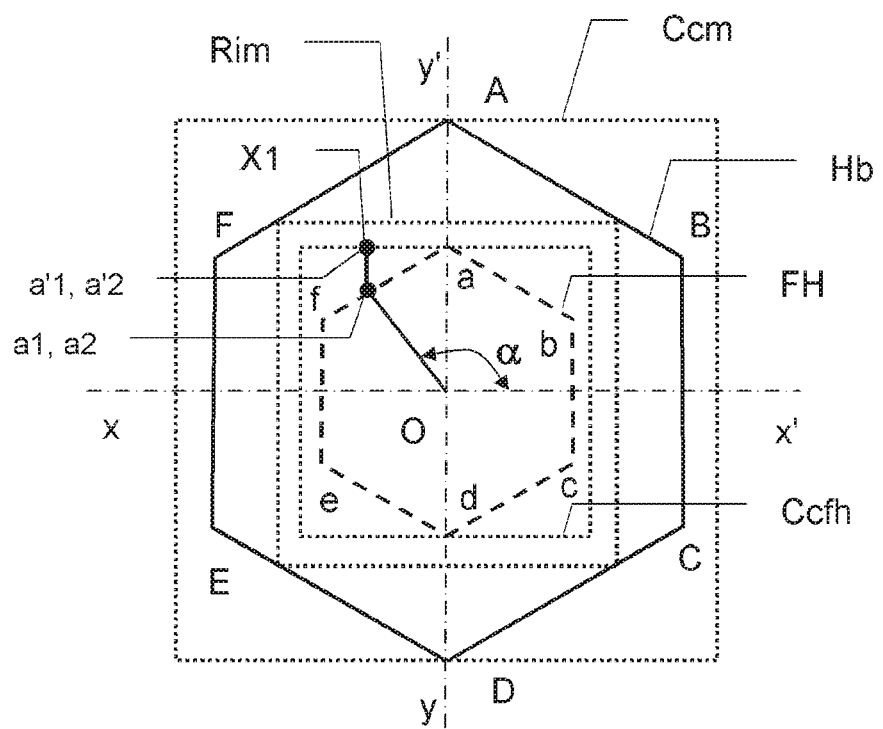
FIG. 3 illustrates a second execution of the processing of the measured position of the control lever of FIG. 1 performed by the process according to an embodiment of the invention.

The stop 20a is a polygon for example (such as a pentagon, hexagon, heptagon, octagon, dodecagon, ellipse), and if the positions of the point PL are projected into a base plane, perpendicular or substantially perpendicular to the control lever when the latter is in the rest position (as shown in FIG. 1 in solid lines), the projected positions will all be contained in a stop hexagon Hb shown in FIG. 2 or 3, and which has A, B, C, D, E and F as apices. The base plane can be inclined by a few degrees from a plane perpendicular to the control lever when the latter is in the rest position, and the projections will all contained in a non—regular hexagon in the event where the mechanical stop is a hexagon.

In fact, FIGS. 2 and 3 show the stop hexagon Hb, which is the limit of travel of the control lever 10. In conventional terms, it is understood that when the control lever 10 is stopped, the games controller must send information to the games console stating that the intensity of the travel is maximal.

However, the movement of the control lever 10 is limited by a hexagon, but the games console must receive a position from the control lever 10 in the form of a set of Cartesian coordinates, and the norm of a vector between the origin of the Cartesian frame of reference and the projected position in the base plane must be maximal.

In the Cartesian frame of reference (x-x'; y-y') shown in FIGS. 2 and 3, when the control lever 10 is stopped pointing up, according to a 45° diagonal, the signal sent to the console must be full-scale, therefore the Cartesian coordinates are for example (1, 1). However, if an inscribed rectangle Rim is traced in the stop hexagon Hb, and if the control lever 10 is shifted upwards out of the inscribed rectangle Rim, and still in the stop hexagon Hb without being stopped, the coordinate according to the axis y'-y would have to be further increased, but this would distort the interpretation made by the console since the norm of the vector between the origin and the projected position in the base plane would be greater than that of the vector when the control lever 10 is stopped on the diagonal.

As a consequence, there would be incoherence of the intensity of the travel restored by the console: intensity 1 when the projected position of the control lever is on the diagonal at 45° and on the stop hexagon Hb (control lever 10 stopped at 45°), and greater intensity when the projected position of the control lever is out of the inscribed rectangle Rim, but not on the stop hexagon Hb (control lever 10 not stopped).

To avoid this incoherence, once the projected position of the control lever 10 exits the inscribed rectangle Rim, one of the Cartesian coordinates is imposed on 1, which amounts to ignoring four travel zones which are zones of planes defined by the zones of the stop hexagon Hb which are out of the inscribed rectangle Rim.

It is understood that during travel of the control lever 10 according to a cardinal direction (the projected position is therefore on one of the axes yy' or xx'), full scale is reached once projected position is on or exceeds the inscribed square Rim.

To rectify this disadvantage, and to consider the entire travel zone of the stop hexagon Hb, the invention proposes calculating the set of coordinates which will be sent to the games console by creating homothety from the projected position of the control lever 10 in the base plane.

FIG. 2 shows a first execution of this calculation, in two specific cases.

In the first specific case, the control lever is in the position X1, and the projected position in the base plane has as coordinates (a1, a2). Initially, a homothetic figure FH of the stop hexagon Hb is determined, which passes through the projected position of coordinates (a1, a2), and which is centered on the rest position of the control lever (the origin of the reference frame (xx', yy')). This is the hexagon abcdef.

For this step the process first determines the angle α between a reference frame axis xx' and the radius which passes through the projected position to determine in which angular sector of the plane contains the projected position. In fact, this angular determination is needed to determine which straight line equation must be resolved to find an edge parallel to the stop hexagon Hb.

In the illustrated example, the angle α determines that the projected position is on a straight line parallel to the edge FA of the stop hexagon Hb. It is then possible to determine with certainty the straight line parallel to (FA) and the homothetic figure FH which passes through the projected position of the coordinates (a1, a2) which is the hexagon of apices abcdef.

Next, the process determines a circumscribed square Ccfh on the homothetic figure FH (this is the square which has twice the length Oa as a side, that is, the ordinate a'2), and determines the point of intersection of the radius passing through the projected position of coordinates (a1, a2) with the circumscribed square Ccfh, which has as coordinates (a'1, a'2).

It is the coordinates (a'1, a'2) which will be sent to the games console. To calculate them, the length of the radius R1 of the homothetic figure FH which passes through the point (a1, a2) is determined by way of the Pythagoras theorem (equation 1). And then the length R2 of the segment which has as its ends the origin of the frame of reference and the point of coordinates (a'1, a'2) is determined by the Thales' theorem (equation 2).

$$R1=\sqrt{(a1^2+a2^2)} \quad \text{Equation 1}$$

$$R2=R1 \cdot a'2/a2$$

It then remains to multiply each coordinate of the first set of coordinates (a1, a2) by the ratio R2/R1 to find the coordinates of the second set of coordinates (a'1, a'2).

The process therefore performs homothety based on a difference in dimension between the homothetic figure FH and its circumscribed square Ccfh. The projected position is artificially "augmented" or "displaced" towards the circumscribed square Ccfh to find the second set of coordinates. This is about projection according to the radial direction.

It should be noted that the second set of coordinates is equal to the first set of coordinates when the control lever is shifted only in a vertical cardinal direction (along the axis yy'): the homothety then has a ratio of 1. Also, the homothety ratio is maximal when the control lever 10 is shifted along a diagonal at 45°.

As a consequence, the console does receive a second set of Cartesian coordinates, with full scale only when the control lever is stopped, and this without ignoring the measuring zone.

The position X2 of FIG. 2 correctly shows the control lever 10 stopped, and the coordinates of the projected position are (b1, b2), located on the stop hexagon Hb. The transformation amounts to calculating the projection of the projected position on the circumscribed square Ccm according to the radial direction which passes through the projected position to calculate the second set of coordinates (b'1, b'2) which will be sent to the console.

The process according to embodiments of the invention can perform the steps for determining the homothetic figure, the circumscribed square Ccfh and the projection to each measurement of the position of the control lever 10 to calculate the second set of coordinates with the homothety ratio, or else a predefined table can be built by calculating the homothety ratio for all possible positions, storing this predefined table in the games controller and simply searching for the adequate ratio as a function of a measured position, and multiplying the coordinates measured by the adequate ratio to find the second set of coordinates. As an alternative the second set of coordinates can be stored directly in the predefined table.

FIG. 3 shows a first alternative. In this alternative, determining the homothetic figure FH and the circumscribed square Ccfh is identical. However, instead of projecting the projected position according to the radial direction, the process performs a single projection parallel to one of the axes xx' or yy', and in particular towards the side of the circumscribed square which is the closest, to find the second set of Cartesian coordinates to be sent to the games console.

In particular, in the specific case where the control lever 10 is in the position X1, the first set of coordinates of the projected position is (a1, a2). The closest side of the circumscribed square Ccfh is the upper horizontal side, so that the coordinates of the second set of coordinates will be (a'1, a'2), with:

$$a'1=a1$$

$$a'2=\text{distance } Oa \text{(determined during determination of the homothetic figure } FH\text{).}$$

Figure 4:
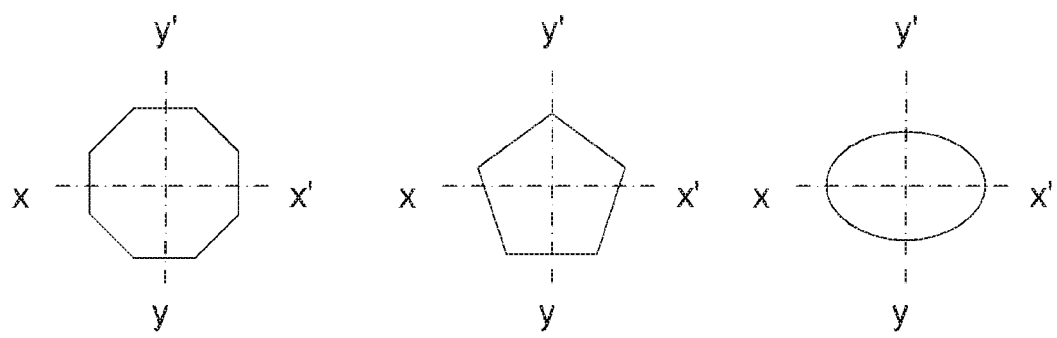
FIG. 4 illustrates possibilities of shapes adopted to create a mechanical stop of the control lever.

FIG. 4 illustrates variants of the shape of the mechanical stop defining the travel zone of the control lever, with from left to right an octagon, a pentagon or an ellipse.

In the case of polygons, prior to determining the equation of the homothetic figure passing through the projected position, the method will use determination of the angular sector containing the projected position to identify with which side of the mechanical stop the straight parallel line passing through the projected position and defining the homothetic figure has to be determined. In the case of an octagon there are eight angular sectors; in the case of a pentagon there are five angular sectors.

In the case of an ellipse there is no need to determine in advance an angular sector; after projection of the position of the lever in the base plane the process can directly determine the equation of a homothetic ellipse on the stop, and which passes through the projected position.

It will be understood that various modifications and/or improvements obvious to the skilled person can be made to the different embodiments of the invention described in the present description without departing from the scope of the invention defined by the appended claims. In particular, reference is made to a first set of coordinates, and it is not specified which format is used for this first set of coordinates. The invention can function with a first set of cylindrical, spherical, or even Cartesian coordinates.

In addition, it is apparent that embodiments of the invention include a step providing a stop of polygonal or elliptical shape. In fact, embodiments of the invention relate to the conversion of coordinates of a lever manipulated within the limits of a mechanical stop; accordingly there is a step consisting of manufacturing and providing such a mechanical stop of polygonal or elliptical shape on a games controller.

Finally, it is possible to set up the predefined conversion table for any of the aspects of the invention explained hereinabove.

The invention claimed is:

1. A control process of a position and/or travel of a display element generated on a display screen by a video games console coupled to a games controller comprising a control lever arranged to be shifted by a user according to at least two degrees of liberty in a zone delimited by a mechanical stop, the process comprising the steps of:
   measuring a position of the control lever in the determined zone with at least one sensor (12) outputting at least one electric signal per degree of liberty,
   projecting in a base plane the position of the control lever measured with said at least one sensor, to determine a first set of coordinates,
   determining a homothetic figure (FH) of a projection of the mechanical stop in the base plane, centered on a rest position of the control lever and passing through the projected position of the control lever in the base plane,
   determining a circumscribed square (Ccfh) on the homothetic figure (FH),
   projecting onto the circumscribed square (Ccfh) at least one coordinate of the first set of coordinates; and
   calculating a second set of coordinates in a Cartesian frame of reference, on the basis of the projection of said at least one coordinate of the first set of coordinates on the circumscribed square (Ccfh) so as to be able to send to the console the second set of Cartesian coordinates which is an image of the first set of coordinates.

2. A control process according to the claim 1, wherein the mechanical stop has a polygonal shape, and wherein the step for determining the homothetic figure (FH) comprises a step of determining in the base plane an angular sector containing the projected position of the control lever, then a step of determining a straight line passing through the projected position and parallel to one side of the polygonal projection of the mechanical stop in the base plane, contained in the determined angular sector.

3. The control process according to claim 1, wherein the mechanical stop has an elliptical shape, and wherein the step for determining the homothetic figure (FH) comprises a step of determining a position ellipse centered on the rest position of the control lever and passing through the projected position of the control lever in the base plane.

4. The control process according to claim 1, wherein the projection step of said at least one coordinate of the first set of coordinates on the circumscribed square (Ccfh) comprises a step of determining a projected position point as being a point of intersection of an axis passing through the rest position of the control lever and the projected position, with the circumscribed square (Ccfh).

5. The control process according to claim 1, wherein the projection step of said at least one coordinate of the first set of coordinates on the circumscribed square (Ccfh) comprises a step of projecting onto the circumscribed square (Ccfh) the projected position, according to a direction of projection defined by a radius of the homothetic figure (FH) passing through the projected position.

6. The control process according to claim 4, wherein the calculation step of the second set of Cartesian coordinates comprises:
   a step of calculating a first length as being a length of a segment connecting the rest position (Cp) to the projected position;
   a step of calculating a second length as being a length of a segment connecting the rest position to the projected position point; and
   a step of multiplying each coordinate of the first set of coordinate by a factor defined by a ratio of the second length on the first length.

7. The control process according to claim 1, wherein the step for projecting said at least one coordinate of the first set of coordinates on the circumscribed square (Ccfh) comprises at least one step of projecting the projected position on the circumscribed square (Ccfh), according to a projection direction defined by an axis of an orthonomed system.

8. The control process according claim 1, wherein the projection step of said at least one coordinate of the first set of coordinates on the circumscribed square comprises:
   a step of projecting onto the circumscribed square (Ccfh) the projected position, according to a first direction of projection defined by an axis of an orthonomed system defining the shortest distance between the projected position and the circumscribed square (Ccfh), to define a single projection point.

9. The control process according to claim 8, wherein the second set of Cartesian coordinates is defined by the Cartesian coordinates of the single projection point.

10. The control process as claimed in claim 1, wherein the steps of determining the homothetic figure (FH), determining the circumscribed square (Ccfh) on the homothetic figure (FH), projecting on the circumscribed square (Ccfh) said at least one coordinate, and calculating the second set of coordinates in a Cartesian frame of reference are conducted previously for all the possible projected positions of the control lever in the base plane so as to define a predefined conversion table of the first set of coordinates to the second set of coordinates.

11. The control process according to claim 10, wherein the predefined conversion table inputs the first set of coordinates, and outputs a coefficient for multiplying with each coordinate of the first set of coordinates, to calculate the second set of coordinates.

12. The control process according to claim 10, wherein said predefined conversion table inputs the first set of coordinates, and outputs the second set of coordinates.

13. The control process according to claim 1, comprising a step of sending the second set of Cartesian coordinates to the games console.

14. The control process according to claim 13, wherein the steps up to the calculation step of the second set of coordinates are conducted with a first resolution, and wherein a step of reducing the resolution prior to the step for sending the second set of coordinates is provided, for sending the second set of coordinates according to a second resolution, lower than the first resolution.

15. The control process according to claim 1, wherein the position and/or the travel of the display element generated on the display screen is modified on the basis of the second set of Cartesian coordinates.

* * * * *